(12) United States Patent
Hollingsworth et al.

(10) Patent No.: US 7,250,598 B2
(45) Date of Patent: Jul. 31, 2007

(54) PLASMON ENHANCED NEAR-FIELD OPTICAL PROBES

(76) Inventors: Russell E. Hollingsworth, 11337 W. 55th La., Arvada, CO (US) 80002; Reuben T. Collins, 1208 5th St., Golden, CO (US) 80403

( * ) Notice: Subject to any disclaimer, the term of this patent is extended or adjusted under 35 U.S.C. 154(b) by 237 days.

(21) Appl. No.: 11/072,017

(22) Filed: Mar. 4, 2005

(65) Prior Publication Data

US 2005/0161594 A1    Jul. 28, 2005

Related U.S. Application Data

(63) Continuation-in-part of application No. 11/028,074, filed on Jan. 3, 2005, now Pat. No. 7,176,450.

(60) Provisional application No. 60/550,618, filed on Mar. 4, 2004, provisional application No. 60/534,027, filed on Jan. 2, 2004.

(51) Int. Cl.
    *G11B 11/00* (2006.01)
(52) U.S. Cl. .................... 250/234; 369/13.33; 977/862
(58) Field of Classification Search ................ 250/216, 250/234–236, 306–311; 356/501; 73/104, 73/105; 977/862, 863; 369/13.32, 13.33, 369/112.27, 300
    See application file for complete search history.

(56) References Cited

U.S. PATENT DOCUMENTS 6,834,027 B1* 12/2004 Sakaguchi et al. ....... 369/13.32
7,057,151 B2*  6/2006 Lezec et al. ................ 250/216

* cited by examiner

*Primary Examiner*—Thanh X. Luu
*Assistant Examiner*—Suezu Ellis
(74) *Attorney, Agent, or Firm*—Lathrop & Gage LC

(57) ABSTRACT

A plasmon enhanced near-field optical probe has an optical coupler with an end face and a metal coating forming at least one plasmon enhancement structure. An extension provides probe-to-sample separation feedback. A microscope cantilever has a lever arm with an aperture, a tip to provide tip-to-sample separation feedback, and a plasmon enhancement structure. An air bearing slider apparatus has a base, air bearing slider pads, and a metal film forming a plasmon enhancement structure about an aperture. A plasmon enhanced optical probe end cap has a socket with an entry aperture for an optical fiber and an exit aperture with a plasmon enhanced transmission structure. A positioning subsystem has a piezoelectric member that adjusts a length of the positioning subsystem, and a quadranted piezo device that adjusts a position of the positioning subsystem.

20 Claims, 17 Drawing Sheets

PLASMON ENHANCED NEAR-FIELD OPTICAL PROBES

CROSS-REFERENCE TO RELATED APPLICATIONS

This application claims the benefit of priority of U.S. Provisional Patent Application No. 60/550,618, filed 4 Mar. 2004 and incorporated herein by reference. This application is also a continuation-in-part of commonly-owned and U.S. patent application Ser. No. 11/028,074, filed 3 Jan. 2005 now U.S. Pat. No. 7,176,450 and incorporated herein by reference, which claims the benefit of priority of U.S. Provisional Patent Application No. 60/534,027, filed 2 Jan. 2004 and incorporated herein by reference.

BACKGROUND

Certain optical devices, such as near-field scanning optical microscopes ("NSOMs") and optical storage devices, may operate by scanning an optical probe ("probe") over a sample. Depending on the mode of operation of the optical device, the probe may illuminate or collect electromagnetic (EM) radiation, or both. In these applications, optical probes include light guides with a coating that prevents EM radiation leakage, except at an aperture that is smaller than a wavelength of EM radiation.

In an NSOM, the probe and/or sample move such that the aperture passes over the area to be imaged; an image is constructed on a line-by-line or point-by-point basis. Accordingly, the spatial resolution achievable by an NSOM is not limited by the wavelength of the EM radiation, as in standard microscopy, but rather by the dimension of the aperture through which the EM radiation passes (i.e., a smaller aperture produces a higher resolution image). However, the transmission of EM radiation through a subwavelength aperture decreases significantly with aperture size; this limits the scanning rate and thus the rate at which the NSOM generates the image.

NSOMs may use several types of probes. One example of an NSOM probe includes an optical fiber wit a fiber core, cladding and a fiber end tapered to a diameter of about 100 nm. The sides of the fiber end are coated with metal; an end face of the fiber core is uncoated. An NSOM inputs EM radiation into the fiber, for example through an opposite (untapered) end of the fiber. In the tapered fiber end, the EM radiation is no longer contained within the fiber core by total internal reflection. Accordingly, much of the input EM radiation leaks out of the tapered sides of the fiber end, and the metal absorbs it. Only a small fraction of the input EM radiation thus transmits through the end face as output EM radiation. A ratio of output EM radiation to input EM radiation (a transmission efficiency) of $10^{-6}$ to $10^{-5}$ is typical for such a probe. The damage threshold of the metal coating operates to limit the intensity of EM radiation that may be supplied to the probe; typically, only a few nanowatts of power is transmitted to a sample.

Other NSOM probes, for example employing (non-fiber) light guides, are subject to similar tradeoffs between usable intensity and the damage threshold.

Interactions between photons and surface plasmons in patterned metal films can mitigate certain transmission limitations of tapered optical fibers. Lezec et al. (Science 297, 820 (2002)) shows, for example, that transmission through a sub-wavelength aperture in a metal film can be enhanced by several orders of magnitude if a bulls eye grating (or ruled) pattern of several microns diameter is fabricated in the metal surface surrounding the aperture. Placing this structure on the end face of a partially tapered optical fiber, or other NSOM probe, thus provides an NSOM probe with higher throughput.

Because an NSOM operates in the near field, the probe-to-sample distance is carefully controlled. The probe-to-sample distance is generally obtained by dithering the probe parallel to a sample surface and measuring an oscillation amplitude. A shear-force interaction damps the oscillation amplitude when the probe is within about 30 nm of the surface. Acceptable spatial resolution of the probe-to-sample distance by an NSOM is on the order of the width of the probe. For example, an NSOM probe with a 100 nm wide end may be used over surfaces with feature sizes on the order of 100 nm. But much smoother surfaces are required for the successful use of existing probes with bulls-eye plasmon structures, due to their much larger lateral tip dimensions (on the order of 5 microns).

SUMMARY OF THE INVENTION

In one embodiment, a plasmon enhanced near-field optical probe has an optical coupler with an end face. A metal coating covers the end face except for an aperture. The end face and metal coating form at least one plasmon enhancement structure. An extension extends from the aperture, and away from the optical fiber, to provide probe-to-sample separation feedback.

In one embodiment, a microscope cantilever has a lever arm forming a first aperture for incident electromagnetic radiation. A tip extends away from the lever arm to provide tip-to-sample separation feedback. A plasmon enhancement structure surrounds the tip. Electromagnetic radiation transmitted through one or more apertures of the structure has transmission properties dependent upon ruling of the plasmon enhancement structure.

In one embodiment, an air bearing slider apparatus has a base forming a first aperture. Air bearing slider pads couple with the base. A metal film forms a plasmon enhancement structure about a second aperture. A fraction of electromagnetic radiation entering the first aperture passes through the second aperture with transmission properties dependent upon ruling of the plasmon enhancement structure.

In one embodiment, a plasmon enhanced optical probe end cap has a socket with an entry aperture and an exit aperture. The entry aperture holds an end of an optical fiber. A plasmon enhanced transmission structure is over the exit aperture.

In one embodiment, a positioning subsystem has a piezoelectric member operable to adjust a length of the positioning subsystem in a first direction, and a quadranted piezo device that adjusts a position of an end of the positioning subsystem in a second direction transverse to the first direction.

In one embodiment, a near-field scanning optical microscope system has translational stages for moving either the NSOM probe, or a substrate, such that the NSOM probe traverses over the substrate. A piezoelectric assembly provides fine alignment of the NSOM probe over the substrate.

In one embodiment, a near-field scanning optical microscope system has translational stages for moving either the NSOM probe, or a substrate, such that the NSOM probe traverses over the substrate. A piezoelectric assembly controls tilt of an end face of the NSOM probe over the substrate.

DETAILED DESCRIPTION OF DRAWINGS

Figure 1:
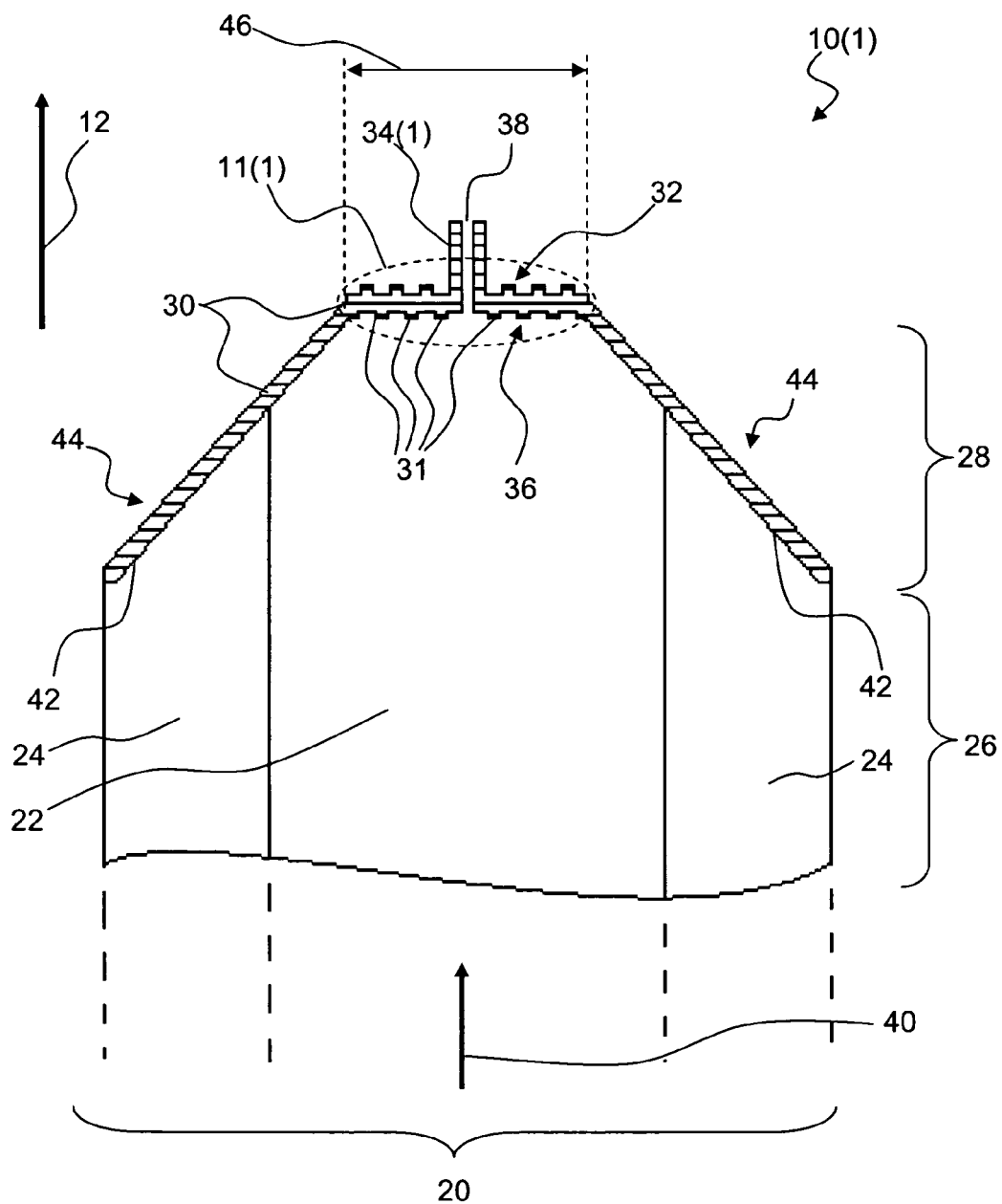
FIG. 1 shows a longitudinal cross-sectional view of one plasmon enhanced near-field optical probe, in accord with an embodiment.

FIG. 1 shows a longitudinal cross-sectional view of a plasmon enhanced near-field optical probe 10(1). Certain features of FIG. 1 are exaggerated for clarity and are not drawn to scale. Plasmon enhanced near-field optical probe 10(1) has an optical fiber 20 that is, for example, a multi-mode ultraviolet ("UV") grade fiber. Optical fiber 20 includes a full thickness region 26, where cladding 24 surrounds a core 22, and a tapered region 28, where cladding 24 thins and disappears (and where core 22 tapers, as shown). The side of fiber 20 in tapered region 28 is shown as side surface 42. Core 22 ends at fiber end surface 36.

Metal 30 coats side surface 42 and fiber end surface 36, except at an aperture 38. An outside surface of metal 30 in tapered region 28 is side surface 44, as shown. An outside surface of metal 30 counter-faces fiber end surface 36 at a metal end surface 32 as shown. The width of metal end surface 32 (shown by arrow 46) is for example about 5 microns.

Fiber end surface 36 and/or metal end surface 32 may be ruled. As shown in FIG. 1, both surfaces 32, 36 are ruled with rulings 31 having similar periodicity; although the periodicity of either surface may be adjusted to modify the performance of optical probe 10(1), such as described below.

When electromagnetic (EM) radiation 40 (e.g., "EM radiation") enters core 22, and enters tapered region 28, some of the EM radiation 40 exits core 22 at aperture 38. At fiber end surface 36, a surface plasmon may exist within metal 30, to interact with EM radiation 40 and increase the transmission of EM radiation 40 through aperture 38 and above the transmission obtainable in the absence of ruled surface 36. A surface plasmon may also exist within metal 30 at metal end surface 32, to interact with EM radiation 40 and alter its directionality when exiting aperture 38. The ruled periodicities of fiber end surface 36 and metal end surface 32 may vary to (a) enhance the transmission of EM radiation 40 through aperture 38 and (b) alter the directionality of EM radiation 40 exiting aperture 38.

The combination of a fiber end surface and a metal end surface, with at least one of the surfaces being ruled, is sometimes denoted herein a "plasmon enhancement structure." In FIG. 1, fiber end surface 36 and metal end surface form plasmon enhancement structure 11(1). The combination of a plasmon enhancement structure (e.g., plasmon enhancement structure 11(1)) with an aperture (e.g., aperture 38) is sometimes denoted herein a "plasmon transmission structure." The use of the terms "plasmon enhancement," "plasmon transmission" and the like may encompass enhanced transmission and/or altered directionality of EM radiation passing through an aperture in a ruled surface, recognizing that underlying physical principles may be described in different terms (e.g., "coherent scattering," "surface waves," "coherent optical phenomenon" and the like).

An extension 34(1) attaches to metal 30 at metal end surface 32 to surround aperture 38 and extend outward (i.e., in the direction of arrow 12) from metal end surface 32.

Figure 2:
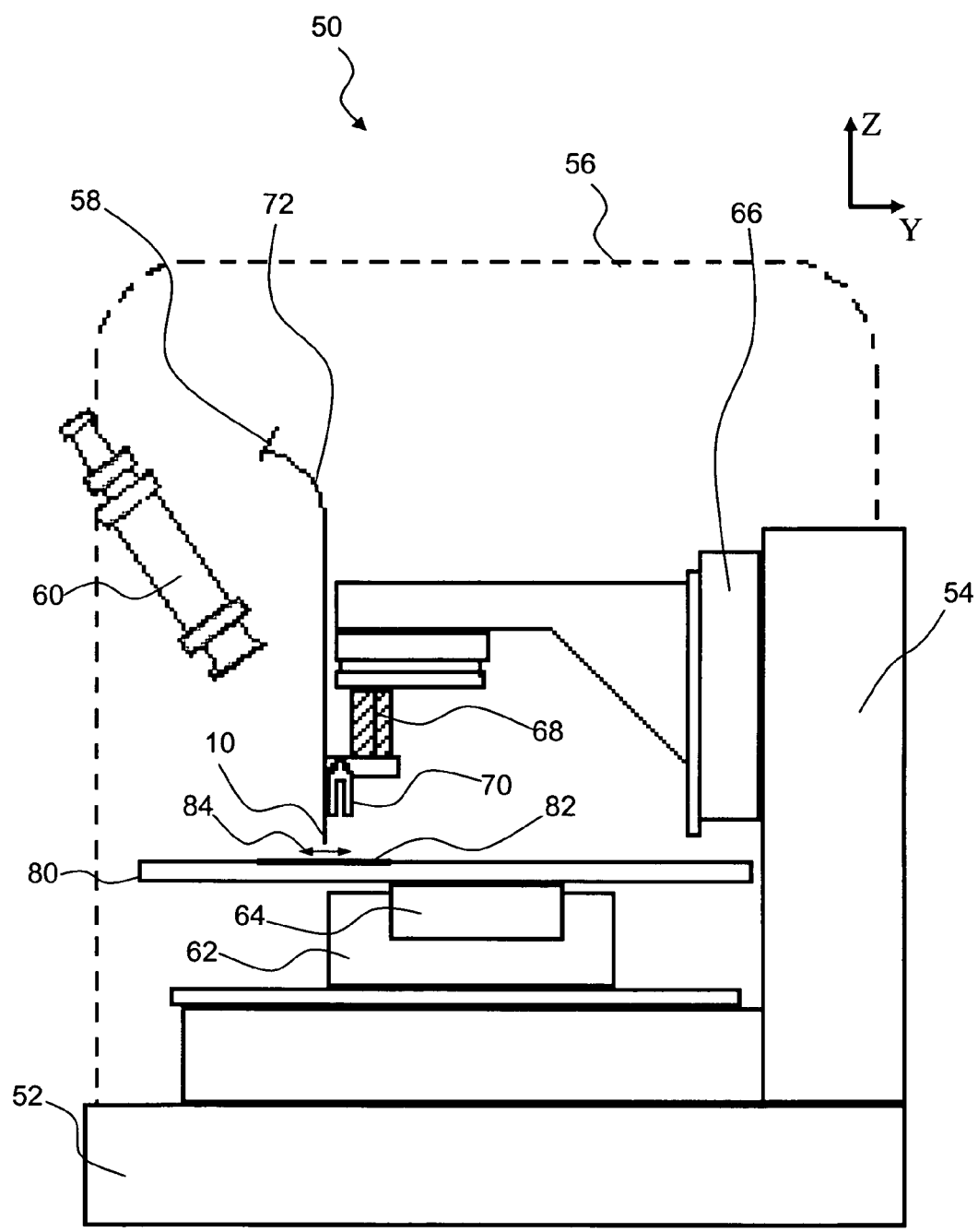
FIG. 2 shows a side view of an NSOM using the plasmon enhanced near-field optical probe of FIG. 1.

FIG. 2 shows an NSOM 50 using plasmon enhanced near-field optical probe 10 (e.g., one of probes 10(1)–10(9); see FIG. 4 through FIG. 11, and FIG. 16A). NSOM 50 includes a base 52, a support member 54, and an enclosure 56. A Y translation stage 62 mounts with base 52; an X translation stage 64 mounts with Y translation stage 62. A stage 80 mounts with X translation stage 64. A sample 82 is placed on stage 80. Through a microscope 60, mounted through enclosure 56, a user may view an area of sample 82 adjacent to plasmon enhanced near-field optical probe 10.

A Z translation stage 66 mounts with support member 54. A positioning subsystem 68 mounts with Z translation stage 66. A tuning fork assembly 70 mounts with positioning subsystem 68. An optical fiber 72 mounts with one side of tuning fork assembly 70. An end of optical fiber 72 passes through opening 58 in enclosure 56 and connects with an EM radiation source (e.g., a light, not shown). Another end of optical fiber 72, just below the point at which optical fiber 72 mounts with tuning fork assembly 70, becomes optical fiber 20 of FIG. 1, and ends as plasmon enhanced near-field optical probe 10.

Figure 3:
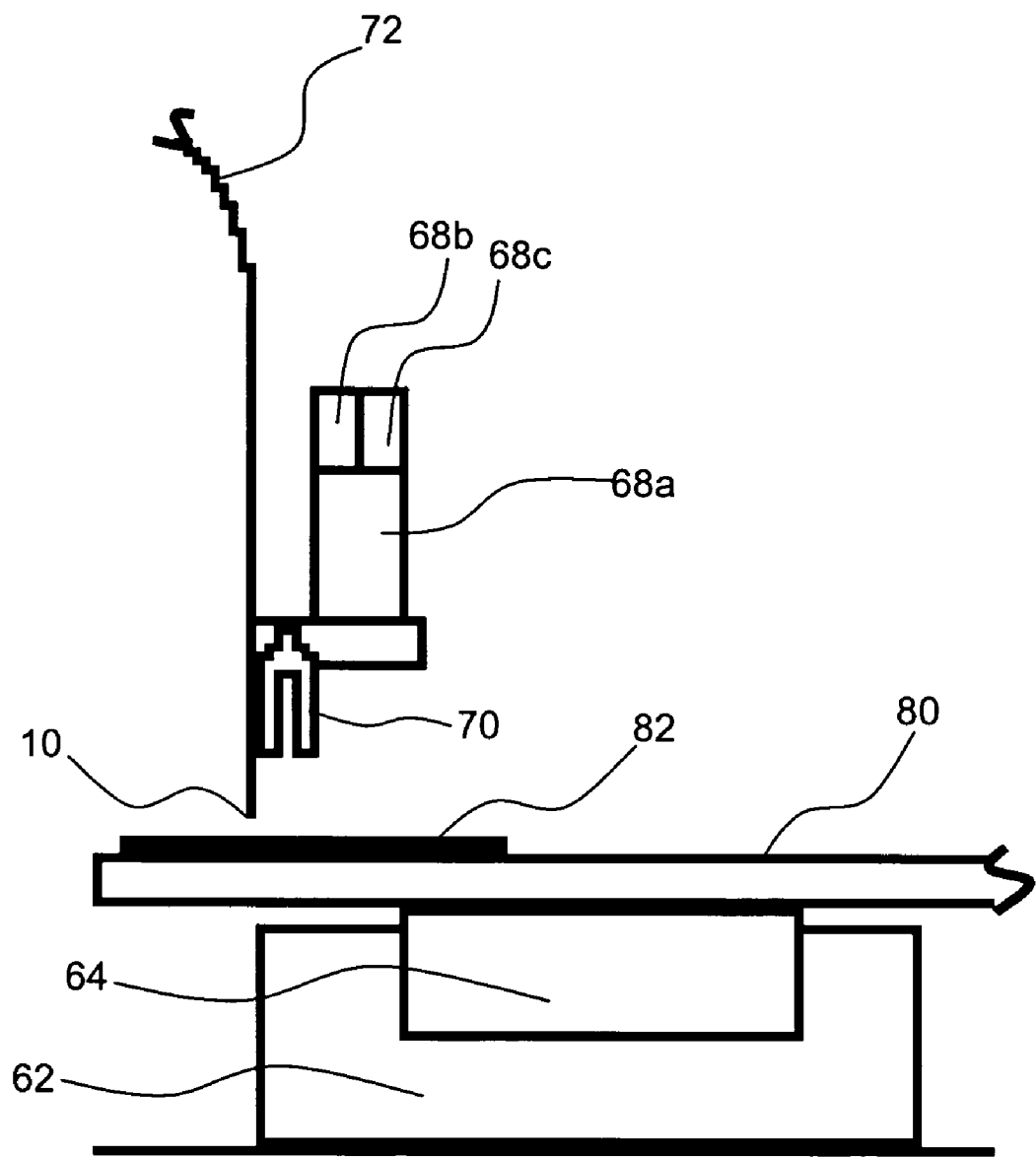
FIG. 3 shows exemplary detail of the NSOM of FIG. 2.

FIG. 3 shows exemplary detail of NSOM 50. Positioning subsystem 68 includes piezo members 68(a) through 68(e); piezo members 68(b) and 68(c) obscure 68(d) and 68(e) in this view. Piezo members 68(b, c, d, e) form a "quadranted piezo device". A voltage supplied to piezo member 68(a) controls the length of piezo member 68(a), to control separation between plasmon enhanced probe tip 10 and sample 82. Voltages supplied to piezo members 68(b, c, d, e) likewise control their lengths. Control of the lengths of piezo members 68(b, c, d, e) enables control of the tilt of piezo member 68(a) and the X-Y location of plasmon enhanced probe 10; moreover, piezo members 68(b, c, d, e) may be sized such that the X-Y location control provided by the piezo members has higher precision than control provided by Y translation stage 62 and X translation stage 64. The quadranted piezo device formed by piezo members 68(b, c, d, e) may be mechanically attached to piezo member 68(a), or all of piezo members 68(a, b, c, d, e) may be formed from a single body of piezoelectric material. For example, an end portion of a piece of piezoelectric material may be machined to form members 68(b, c, d, e) while the remainder of the piece of piezoelectric material forms member 68(a). Control of the tilt of piezo member 68(a) may be used to make metal end surface 32 parallel to the surface of substrate 82, or to effect a fine X-Y alignment of plasmon enhanced probe tip 10 with respect to substrate 82. Stage 80, X and Y translation stages 64 and 62, tuning fork assembly 70 and optical fiber 72, are also shown.

As NSOM 50 operates, tuning fork assembly 70 dithers plasmon enhanced near-field optical probe 10 in the Y direction (in the direction of arrow 84 of FIG. 2), adjacent to a surface of sample 82. An oscillation amplitude measurement of tuning fork assembly 70 indicates a shear-force interaction between plasmon enhanced near-field optical probe 10 and sample 82, with a dampened oscillation amplitude indicating proximity of plasmon enhanced near-field optical probe 10 to sample 82. For example, if tuning fork assembly 70 uses a tuning fork made of a piezoelectric material (e.g., quartz), a current passing through the tuning fork for a given applied voltage gives an oscillation amplitude measurement. Control software uses the oscillation amplitude measurement to adjust a voltage supplied to piezo member 68(a), in order to maintain a constant probe-to-sample separation.

Referring to both FIG. 1 and FIG. 2, when NSOM 50 operates using plasmon enhanced near-field optical probe 10(1), extension 34(1) defines an effective tip width of, for example, 200 nm. This tip width enables high spatial resolution of the oscillation amplitude measurement at aperture 38. Without extension 34(1), the oscillation amplitude measurement can occur anywhere on end surface 32. The location may hop around, depending on the sample, leading to uncontrollable variations in aperture-to-sample separation, which would cause errors in the measurements. Also, without extension 34(1), spatial resolution of topographic measurements is limited to the diameter 46 of metal end surface 32, rather than the much smaller diameter of extension 34(1).

Fiber end surface 36 may further operate to increase the transmission of EM radiation through aperture 38, and metal end surface 32 may further operate to increase the directionality of EM radiation exiting aperture 38. Accordingly, plasmon enhanced near-field optical probe 10(1) may enable higher spatial resolution (with respect to the determination of probe-to-sample distance), and higher optical transmission (enabling fast image generation), as compared to the prior art.

Figure 4:
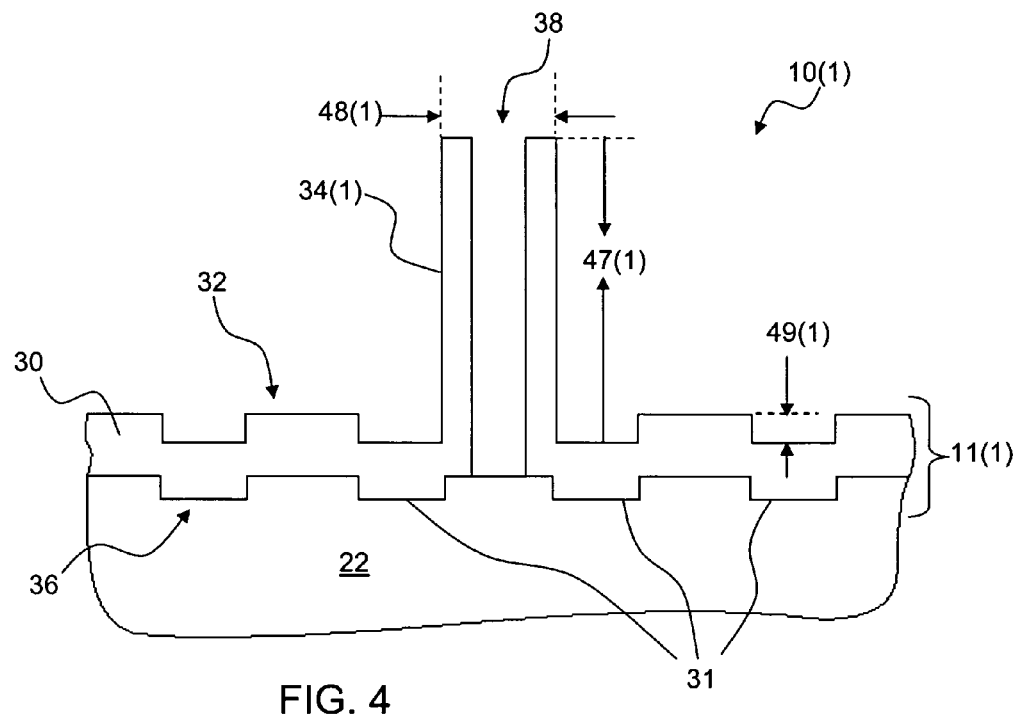
FIG. 4 shows exemplary features of the plasmon enhanced near-field optical probe of FIG. 1, in accord with an embodiment.

FIG. 4 shows exemplary detail of the plasmon enhanced near-field optical probe 10(1) of FIG. 1, in accord with an embodiment. Certain features of FIG. 4 are exaggerated for clarity and are not drawn to scale. Metal end surface 32 counter-faces fiber end surface 36, as shown, and surfaces 32 and 36 may have identical or different periodicities. Extension 34(1) attaches to metal 30 at metal end surface 32, and co-aligns about aperture 38. A height 47(1) of extension 34(1) may be, for example, one micron to five microns: extensions shorter than one micron provide less clearance between metal surface 32 and the sample; extensions longer than five microns are more difficult to manufacture and are mechanically fragile. A width 48(1) of extension 34(1) may be, for example, 200 nm or less: narrower extensions provide enhanced spatial resolution for probe-to-distance measurements, but are difficult to manufacture in the geometry of extension 34(1); also, narrowing the geometry of extension 34(1) results in a smaller aperture 38, reducing optical transmission and forcing a reduction in scan speed of an NSOM.

A depth 49(1) (e.g., a peak-to-valley dimension) of rulings 31 may be between about 40 nm and 60 nm, since plasmon resonance effects decrease with shallower rulings; yet the resonance effects do not continue to increase indefinitely with deeper rulings. More particularly, simulations were carried out in which transmission was modeled as a function of wavelength for a variety of ruling depths. The model assumed a 500 nm ruling period, 200 nm Au film on glass with a 100 nm aperture and ruling depths of 15 nm, 30 nm, 45 nm, 65 nm and 75 nm. The model simulated a maximum transmission with respect to ruling depth, in agreement with published work. This and other simulations suggest a preferred range of 40 nm to 60 nm for ruling depth.

Figure 5:
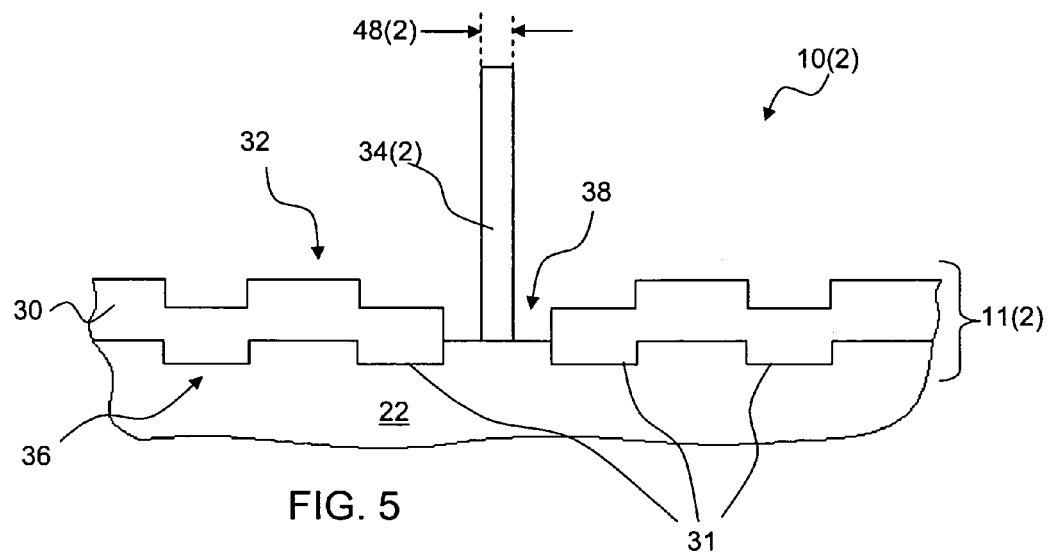
FIG. 5 shows exemplary features of another plasmon enhanced near-field optical probe, in accord with an embodiment.

FIG. 5 shows exemplary features of another plasmon enhanced near-field optical probe 10(2), in accord with an embodiment. Certain features of FIG. 5 are exaggerated for clarity and are not drawn to scale. Metal end surface 32 counter-faces fiber end surface 36, as shown, and surfaces 32 and 36 may have identical or different periodicities. Extension 34(2) centers within aperture 38 and extends away from core 22. Extension 34(2) is for example made from metal. A width 48(2) of extension 34(2) may be, for example, 30 nm or less. Fiber end surface 36 and metal end surface 32, as ruled, form plasmon enhancement structure 11(2). Extension 34(2) may cooperate with plasmon enhancement structure 11(2) to focus electromagnetic radiation outside of aperture 38, to improve resolution of an NSOM using optical probe 10(2).

In FIG. 5, and elsewhere, rulings of the plasmon enhancement structure may optionally reside on only one side of the end face. For example, structure 11(2) in one embodiment may include rulings in surface 32 or in surface 36, but not in both.

Figure 6:
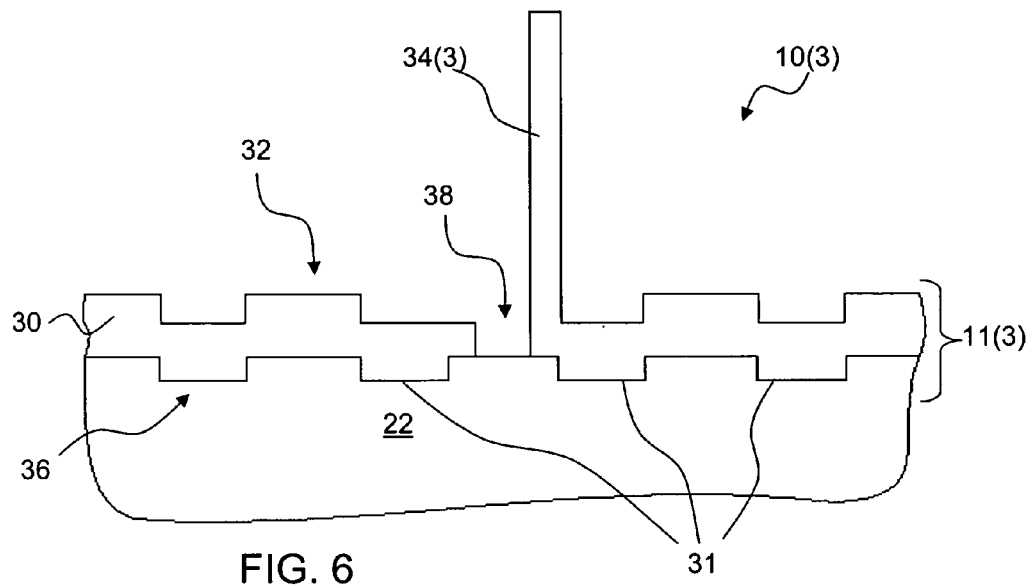
FIG. 6 shows exemplary features of another plasmon enhanced near-field optical probe, in accord with an embodiment.

FIG. 6 shows exemplary features of another plasmon enhanced near-field optical probe 10(3), in accord with an embodiment. Certain features of FIG. 6 are exaggerated for clarity and are not drawn to scale. Metal end surface 32 counter-faces fiber end surface 36, as shown, and surfaces 32 and 36 may have identical or different periodicities. Extension 34(3) is for example made from metal. Extension 34(3)

attaches to metal 30 at metal end surface 32 adjacent to aperture 38, and extends away from core 22, as shown. Fiber end surface 36 and metal end surface 32, as ruled, form plasmon enhancement structure 11(3). Extension 34(3) may cooperate with plasmon enhancement structure 11(3) to focus EM radiation outside of aperture 38 to improve resolution of an NSOM using optical probe 10(3).

Figure 7:
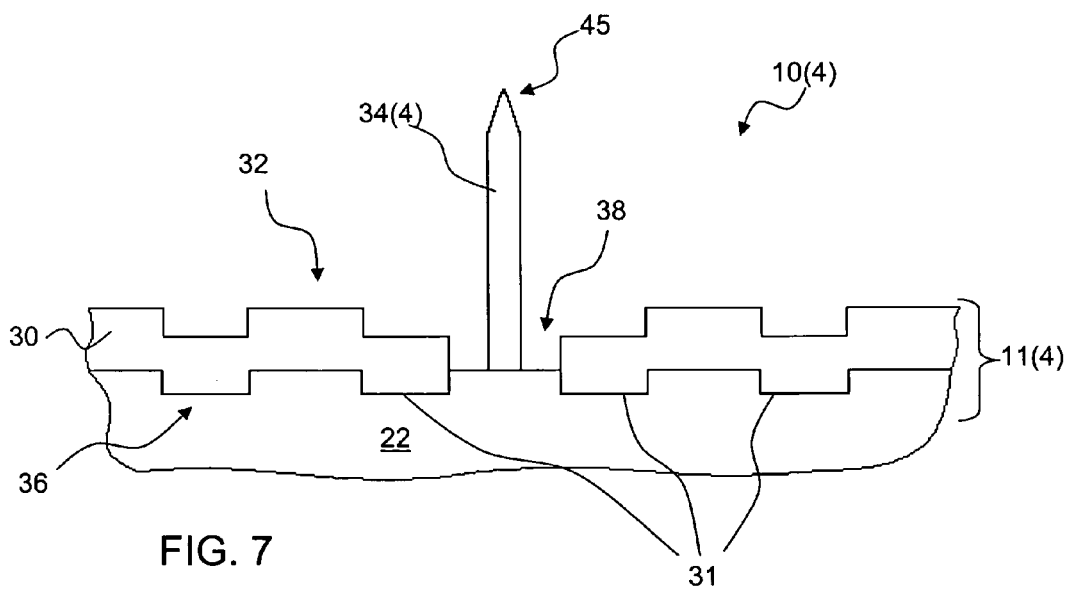
FIG. 7 shows exemplary features of another plasmon enhanced near-field optical probe, in accord with an embodiment.

FIG. 7 shows exemplary features of another plasmon enhanced near-field optical probe 10(4). Certain features of FIG. 7 are exaggerated for clarity and are not drawn to scale. Metal end surface 32 counter-faces fiber end surface 36, as shown, and surfaces 32 and 36 may have identical or different periodicities. Extension 34(4) centers within aperture 38, extends away from core 22, and forms a tip 45. Fiber end surface 36 and metal end surface 32, as ruled, form plasmon enhancement structure 11(4). Extension 34(4) may cooperate with plasmon enhancement structure 11(4) to focus EM radiation outside of aperture 38, to improve resolution of an NSOM using optical probe 10(4).

Figure 8:
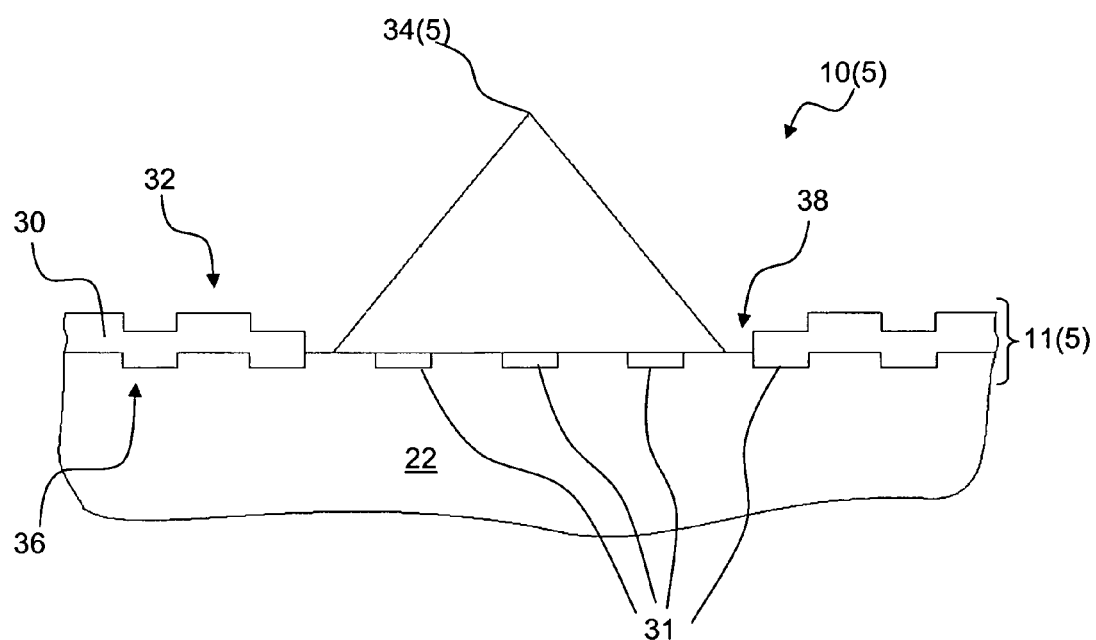
FIG. 8 shows exemplary features of another plasmon enhanced near-field optical probe, in accord with an embodiment.

FIG. 8 shows exemplary features of another plasmon enhanced near-field optical probe 10(5). Certain features of FIG. 8 are exaggerated for clarity and are not drawn to scale. Metal end surface 32 counter-faces fiber end surface 36, as shown, and surfaces 32 and 36 may have identical or different periodicities. Extension 34(5) has a pyramid or conical shape that centers within aperture 38 and extends away from core 22 (also see FIG. 8, FIG. 9 and FIG. 10). Rulings 31 of fiber end surface 36 extends on each side of aperture 38 such that metal elements 33 are under extension 34(5), as shown. Fiber end surface 36 and metal end surface 32, as ruled, form plasmon enhancement structure 11(5). Extension 34(5) may cooperate with plasmon enhancement structure 11(5) to focus EM radiation outside of aperture 38, to improve resolution of an NSOM using optical probe 10(5).

Figure 9:
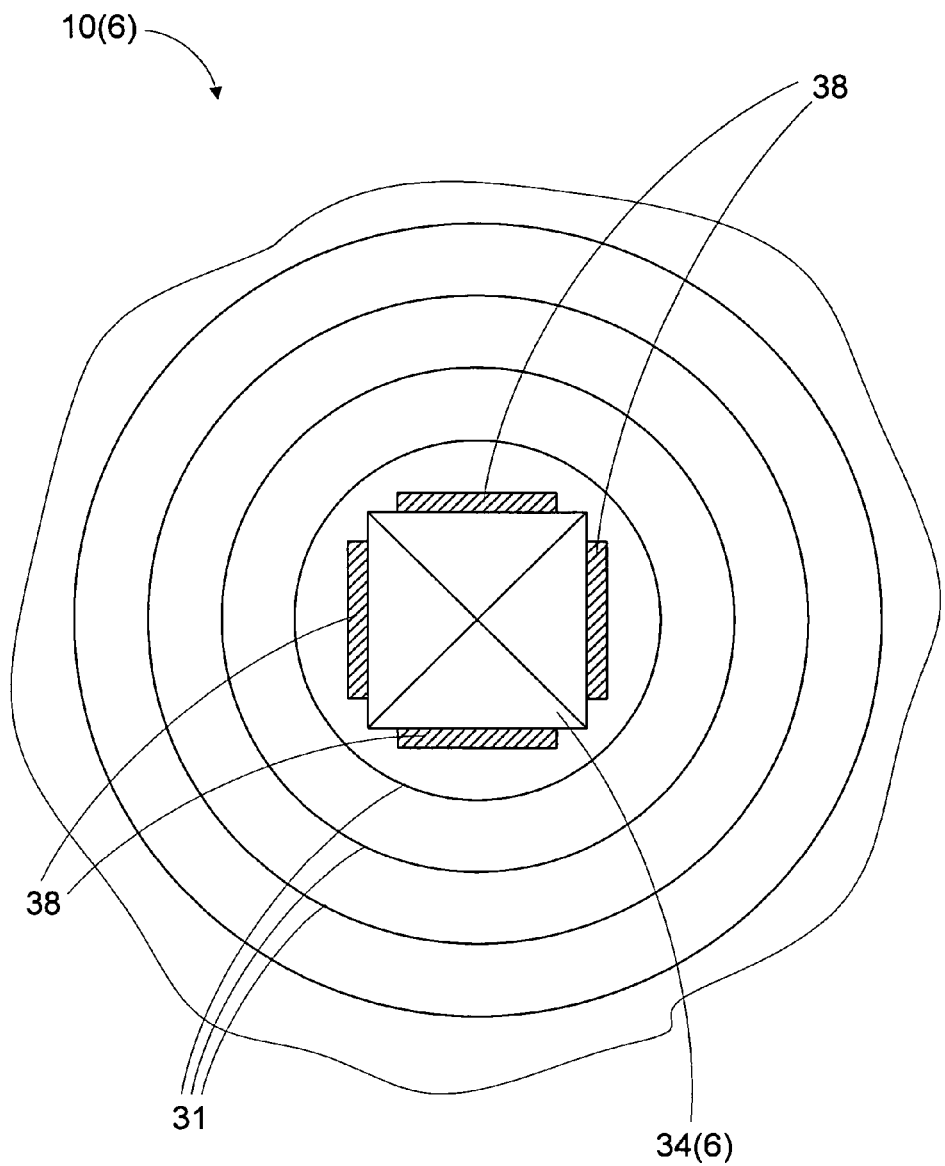
FIG. 9 is a top plan view showing exemplary features of one plasmon enhanced near-field optical probe, in accord with an embodiment.

FIG. 9 is a top plan view showing exemplary features of another plasmon enhanced near-field optical probe 10(6). Certain features of FIG. 9 are exaggerated for clarity and are not drawn to scale. A pyramid shaped extension 34(6) centers within apertures 38. In optical probe 10(6), each aperture 38 is adjacent to one side of extension 34(6), such that extension 34(6) adjoins a surface (e.g., metal coating 30) of optical probe 10(6). Thus, if extension 34(6) is electrically conductive, extension 34(6) is electrically connected with metal coating 30. Rulings 31 surround apertures 38.

Figure 10:
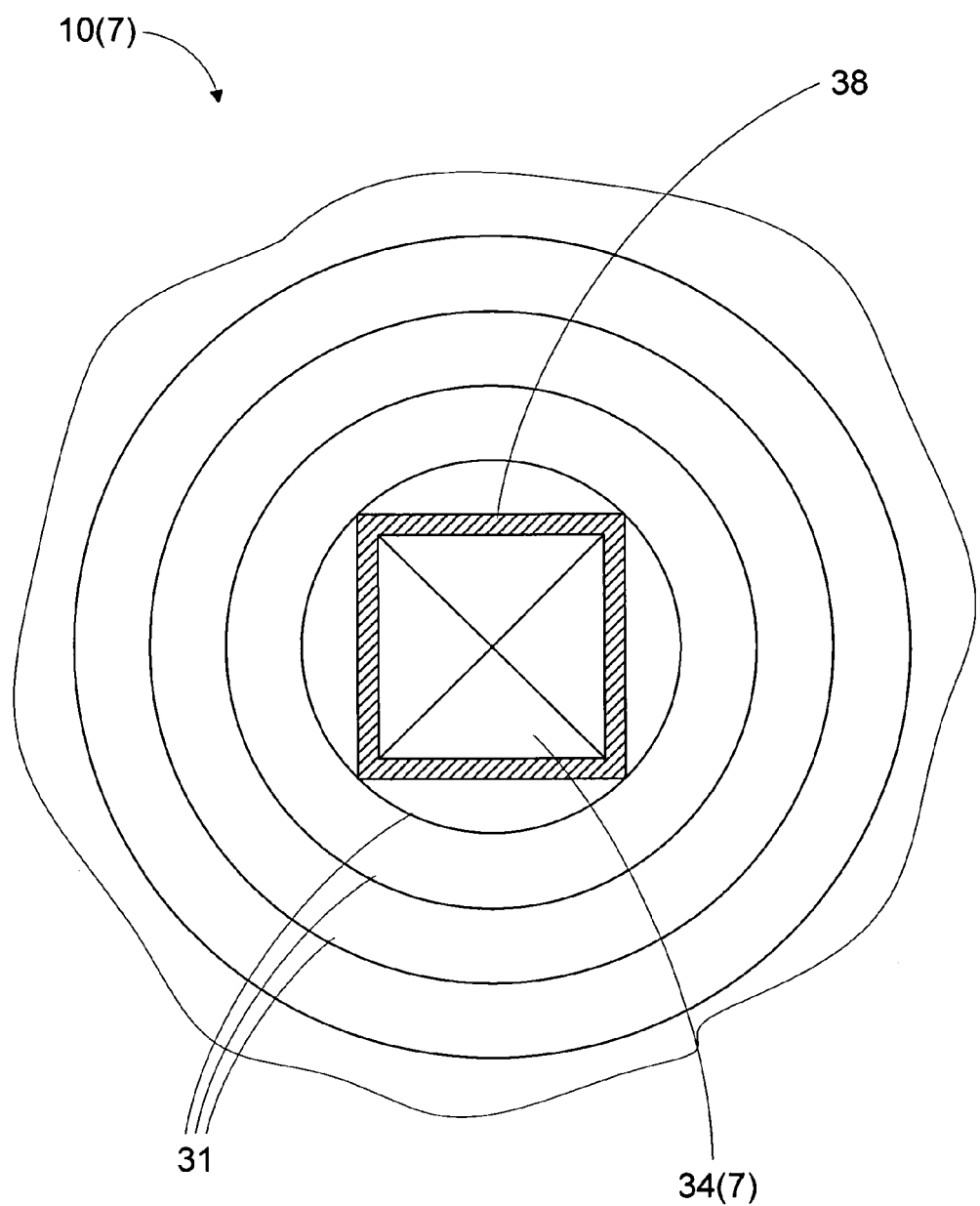
FIG. 10 is a top plan view showing exemplary features of another plasmon enhanced near-field optical probe, in accord with an embodiment.

FIG. 10 is a top plan view showing exemplary features of another plasmon enhanced near-field optical probe 10(7). Certain features of FIG. 10 are exaggerated for clarity and are not drawn to scale. A pyramid shaped extension 34(7) centers within aperture 38. In optical probe 10(7), aperture 38 extends about all sides of extension 34(7). Thus, if extension 34(7) is electrically conductive, extension 34(7) is electrically insulated from metal coating 30. Rulings 31 circumferentially surround aperture 38, as shown.

Figure 11:
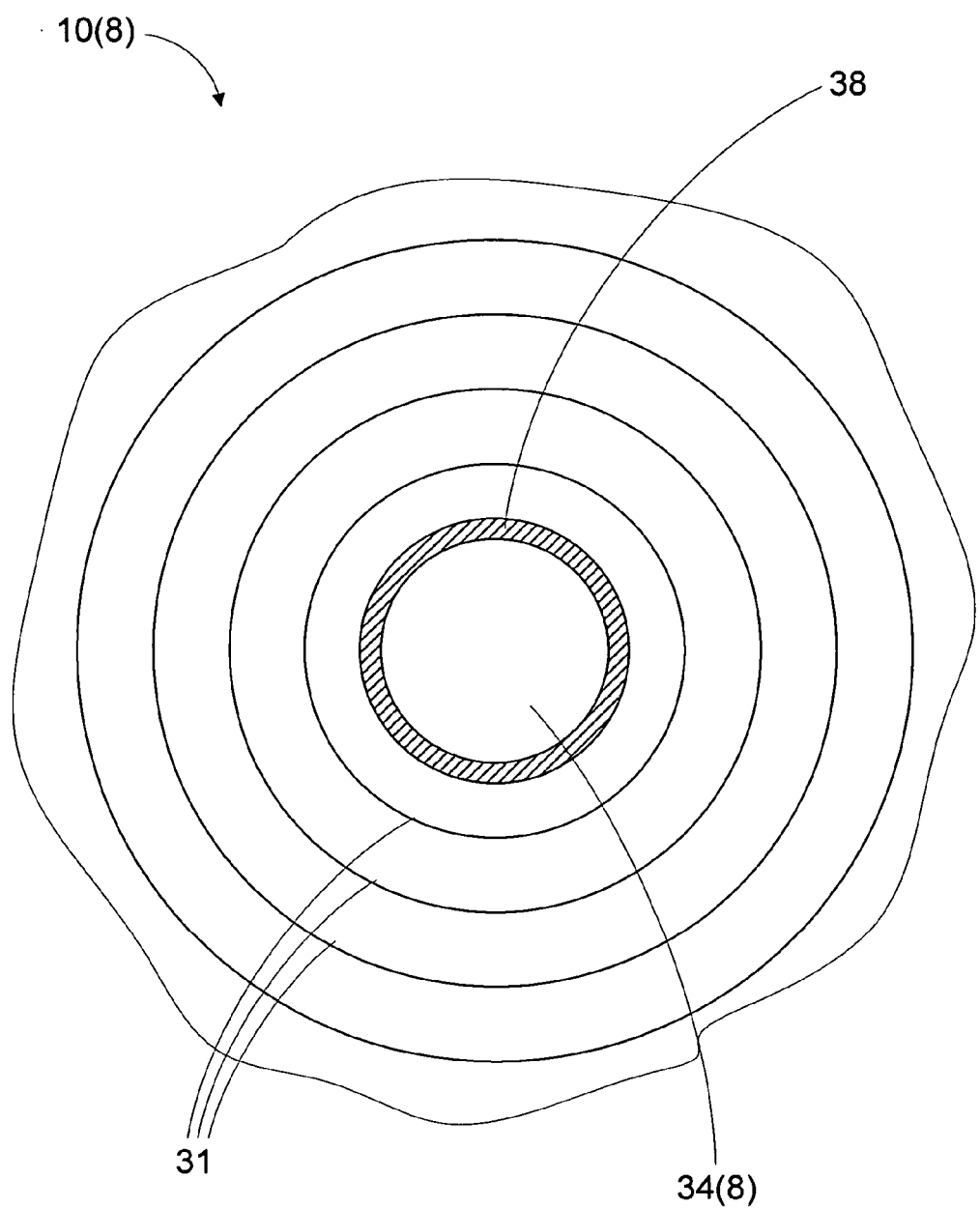
FIG. 11 is a top plan view showing exemplary features of another plasmon enhanced near-field optical probe, in accord with an embodiment.

FIG. 11 is a top plan view showing exemplary features of another plasmon enhanced near-field optical probe 10(8). Certain features of FIG. 11 are exaggerated for clarity and are not drawn to scale. A conical extension 34(8) centers within aperture 38. In optical probe 10(8), aperture 38 extends around extension 34(8). Thus, if extension 34(8) is electrically conductive, extension 34(8) is electrically insulated from metal coating 30. Rulings 31 circumferentially surround aperture 38, as shown.

Other embodiments of plasmon enhanced near-field optical probe 10 are within the scope of this disclosure. For example, extensions 34 (e.g., extensions 34(1)–34(5)) may be made of different materials, other than metal. Extensions 34 may be located in different places relative to aperture 38 (e.g., not coaligned with aperture 38). Extensions 34 may be various shapes, for example solid posts, cones, pyramids, or partial cylinders. Multiple extensions 34 may be employed. The shape and size of rulings, and the patterns of rulings (e.g., circular, elliptical) in plasmon enhancement structures 11 (e.g., plasmon enhancement structures 11(1)–11(5)) can all be varied to optimize performance for a given application.

It will be apparent that optical fiber 20 is one example of an "optical coupler," an element for coupling electromagnetic radiation therethrough. Other optical couplers include, for example, light guides. Plasmon enhanced probes can also be micromachined on, or otherwise added to, atomic force microscope ("AEM") cantilevers and/or other types of NSOM probes (e.g., NSOM probes based an light guides). An end face of an NSOM probe (based on an optical fiber or a light guide, for example) may be conical rather than flat, and plasmon enhancement structures may exist between the conical end face and a metal end coating, and/or on the outside of the metal end coating; such an NSOM probe may also have an extension 34.

Figure 12:
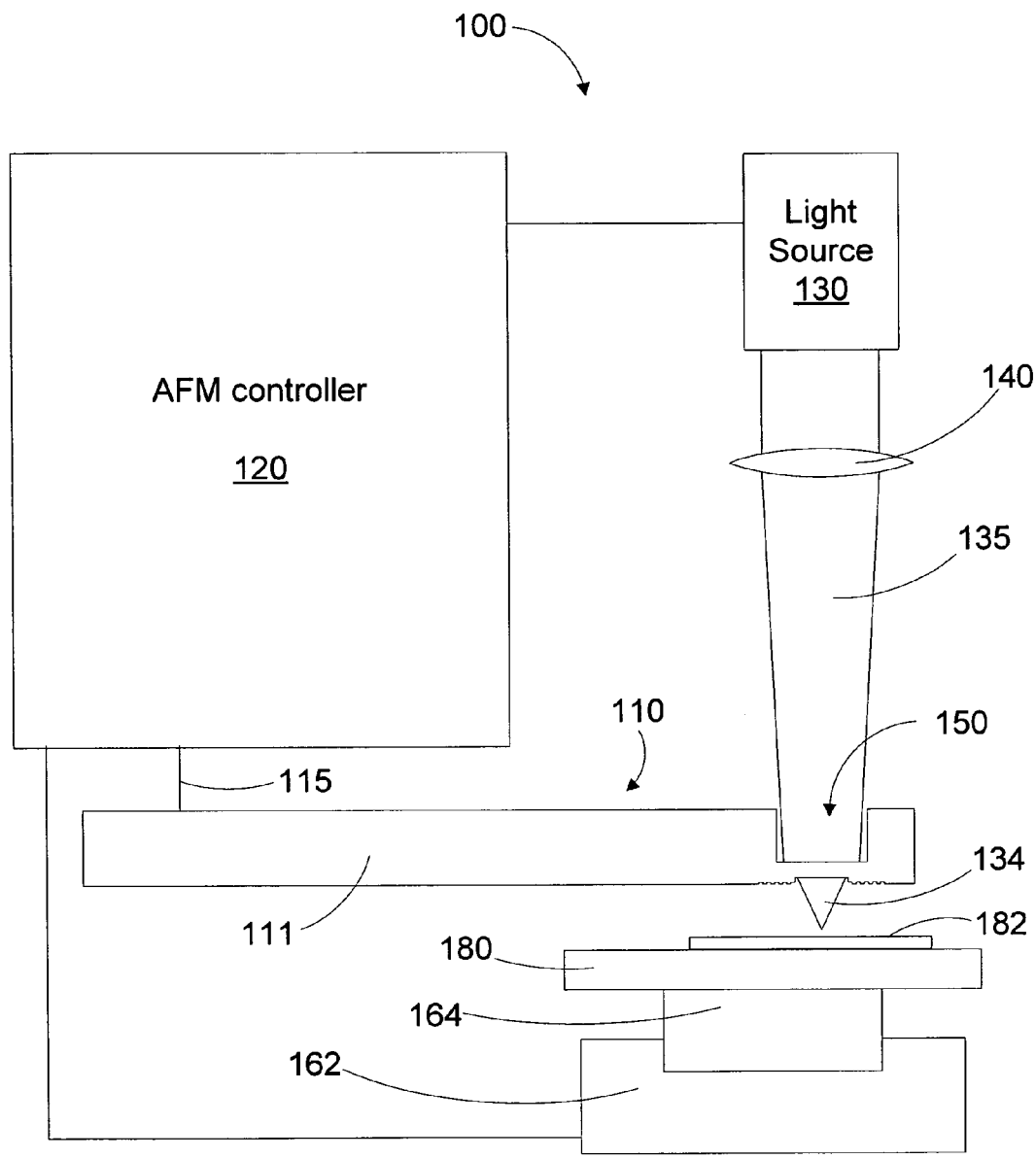
FIG. 12 is a schematic diagram showing components of an Atomic Force Microscope ("AFM") with NSOM capability, using a microscope cantilever in accord with an embodiment.

FIG. 12 is a schematic diagram showing components of an Atomic Force Microscope ("AFM") 100 with NSOM capability, using a microscope cantilever 110. Certain features of FIG. 12 are exaggerated for clarity and are not drawn to scale. AFM 100 includes a controller 120 that controls a light source 130, a Y translation stage 162 and an X translation stage 164. A stage 180 mounts with X translation stage 164. A sample 182 is placed on stage 180.

When AFM 100 operates as an atomic force microscope, controller 120 manipulates cantilever 110 through a mechanical linkage 115, determines force imparted by sample 182 on a tip 134 of cantilever 110 and thereby determines a height of sample 182. By controlling stages 162 and 164 such that sample 182 scans past tip 134, and associating the height of sample 182 at each point of the scan, AFM 100 builds a point-by-point image of the height of sample 182.

When AFM 100 operates as an NSOM, light source 130 projects EM radiation 135, as shown. A lens 140 focuses electromagnetic radiation 135 into an aperture 150 in lever arm 111 of cantilever 110. A fraction of electromagnetic radiation 135 transmits through apertures adjacent to tip 134 (see FIG. 13A and FIG. 13B) towards sample 182. A photodetector or CCD (not shown) converts reflections from sample 182 to electrical signals that are provided to controller 120. By controlling stages 162 and 164 such that sample 182 scans past tip 134, and by associating the electrical signals detected from the electromagnetic radiation reflected from sample 182 at each point of the scan, AFM 100 builds a point-by-point image of the reflectivity of sample 182.

Figure 13A:
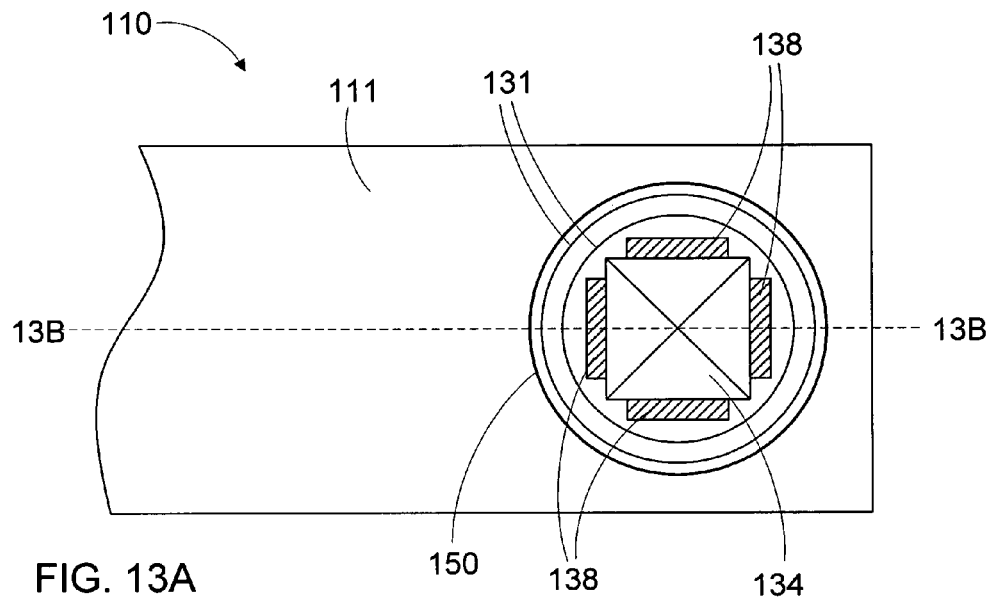
FIG. 13A is a top plan view of part of the microscope cantilever of FIG. 12.

FIG. 13A is a top plan view of a part of microscope cantilever 110. Tip 134 centers within aperture 150 in lever arm 111, as shown. A portion of electromagnetic radiation entering aperture 150 transmits through apertures 138 of cantilever 110 towards a sample (not shown) underneath cantilever 110. Rulings 131 are shown encircling tip 134 and apertures 138.

Figure 13B:
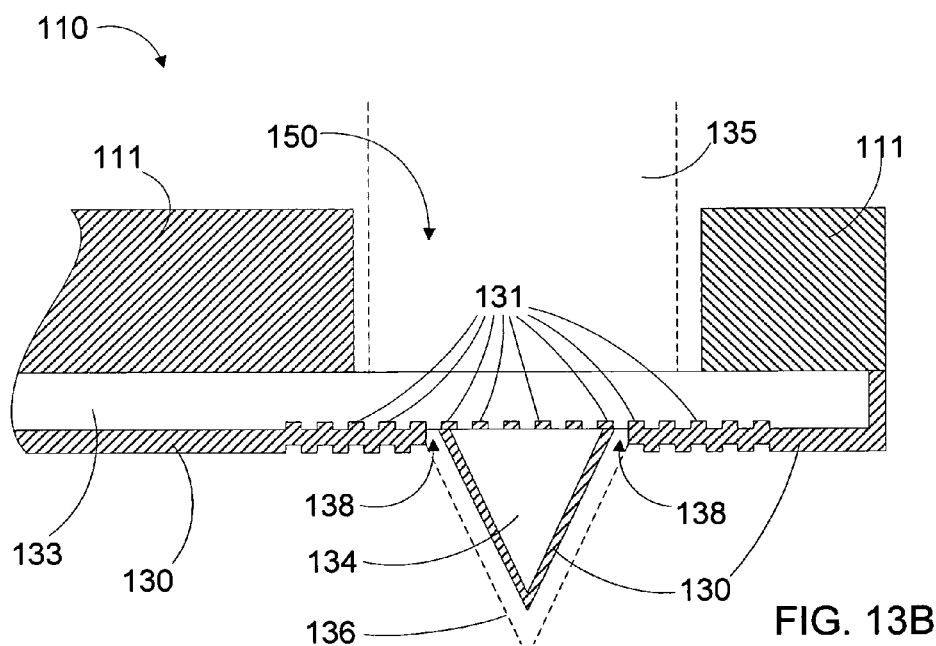
FIG. 13B is a cross-sectional view of the part of the microscope cantilever shown in FIG. 13A.

FIG. 13B is a cross-sectional view of the part of the microscope cantilever shown in FIG. 13A, taken along the line 13B—13B of FIG. 13A. Electromagnetic radiation 135 enters cantilever 110 through aperture 150. A transparent film 133 with rulings 131 supports tip 134. A metal coating 130 covers the bottom side of cantilever 110 (that is, the side of cantilever 110 opposite aperture 150), except apertures 138; metal coating 130 may optionally cover tip 134. Rulings 131 form a plasmon enhancement structure about tip 134 and apertures 138. A fraction of electromagnetic radiation 136 transmits through apertures 138. Tip 134 may cooperate with the plasmon enhancement structure to focus electromagnetic radiation 136 and improve resolution of an NSOM using cantilever 110, as compared to an NSOM using a cantilever without a plasmon enhancement structure.

Figure 14:
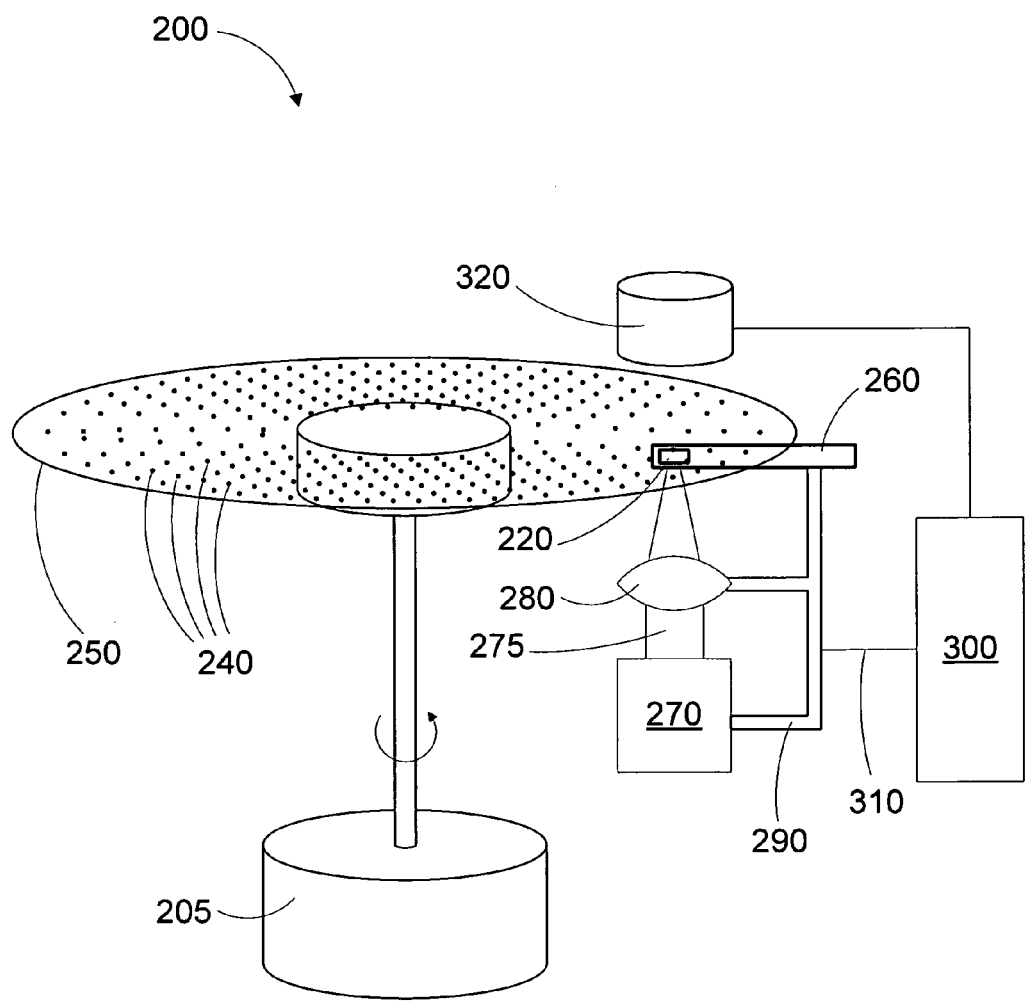
FIG. 14 is a schematic diagram showing components of an optical data retrieval system, using a plasmon enhanced near-field optical probe on an air bearing slider, in accord with an embodiment.

FIG. 14 is a schematic diagram showing components of an optical data retrieval system 200, using a plasmon enhanced near-field optical probe 210 (see FIG. 15A) on an air bearing slider 220. A transparent optical disk 250 has data stored as opaque areas 240, as shown. A motor 205 turns disk 250. Air bearing slider 220 mounts on a spring 260. Air bearing slider 220 is configured with pads (see FIG. 15A) that utilize air viscosity to "fly" over disk 250. Spring 260, an electromagnetic radiation source 270 (e.g., a laser) and optics 280 mount on a carriage 290. A controller 300 controls the position of carriage 290 relative to disk 250 through a linkage 310. Source 270 emits electromagnetic radiation 275 which is focused by optics 280 into air bearing slider 220. A fraction of electromagnetic radiation 275 transmits through air bearing slider 220 (see FIG. 15A, FIG. 15B and FIG. 15C) towards disk 250. A detector 320 transmits an electronic signal to controller 300 that is proportional to the electromagnetic radiation transmitted through disk 250. As disk 250 presents opaque areas 240 adjacent to air bearing slider 220, radiation 275 is interrupted; the signal from detector 320 therefore correlates with the presence or absence of opaque areas 240. A "spot size" presented by air bearing slider 220 on disk 250 (that is, an area of the fraction of electromagnetic radiation 275 transmitted through slider 220 onto disk 250) regulates the density with which data can be recorded on disk 250. A larger spot size requires larger areas 240 thus reducing data density; a smaller spot size allows smaller areas 240 that increase data density.

Figure 15A:
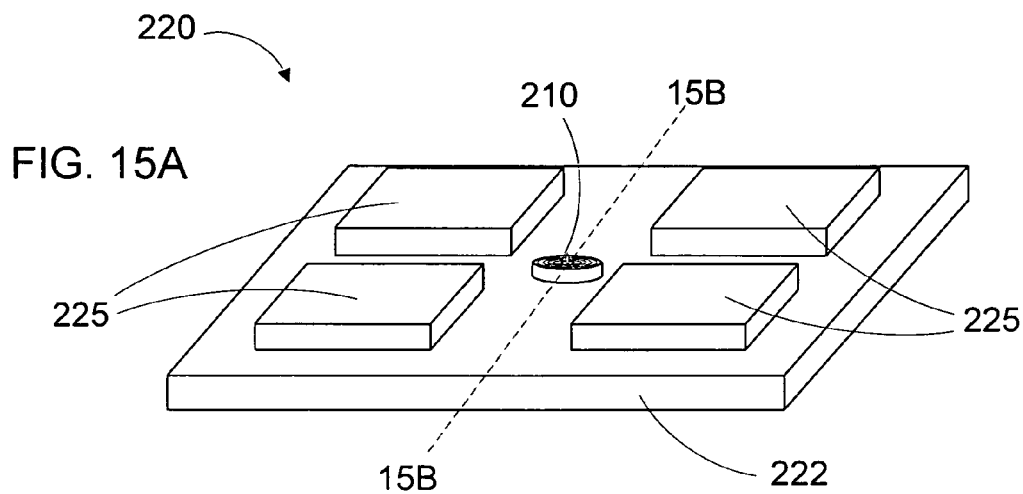
FIG. 15A is a perspective view of a plasmon enhanced near-field optical probe on the air bearing slider of FIG. 14.

FIG. 15A is a perspective view of a plasmon enhanced near-field optical probe 210 on air bearing slider 220. Air bearing slider 220 includes pads 225 that mount on a base 222. Optical probe 210 is located near a center of slider 220, as shown.

Figure 15B:
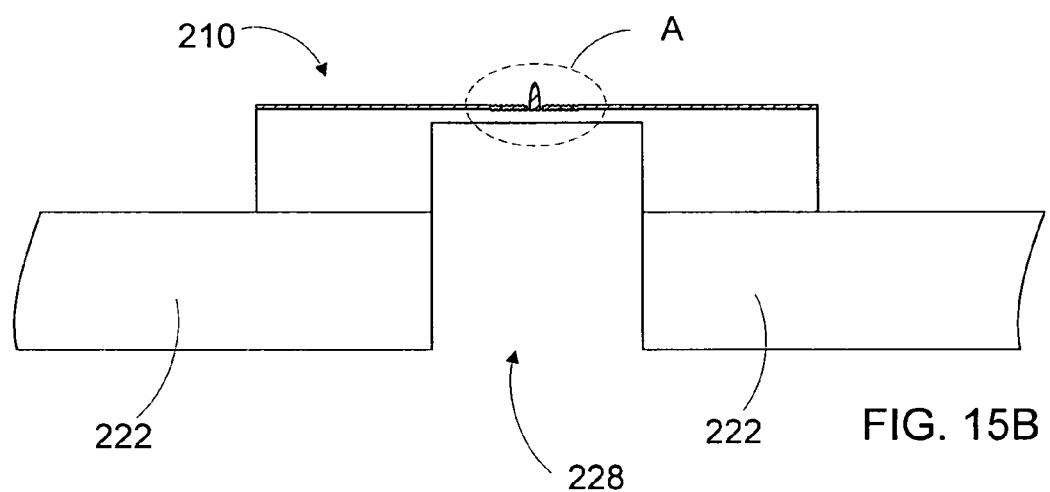
FIG. 15B is a cross-sectional view showing exemplary detail of the air bearing slider of FIG. 15A.

FIG. 15B is a cross-sectional view showing exemplary detail of air bearing slider 220, taken along lines 15B—15B of FIG. 15A. Plasmon enhanced near-field optical probe 210 mounts over an aperture 228 in base 222, as shown. EM radiation enters probe 210 through aperture 228, as shown. A portion A of optical probe 210 is indicated and further illustrated in FIG. 15C.

Figure 15C:
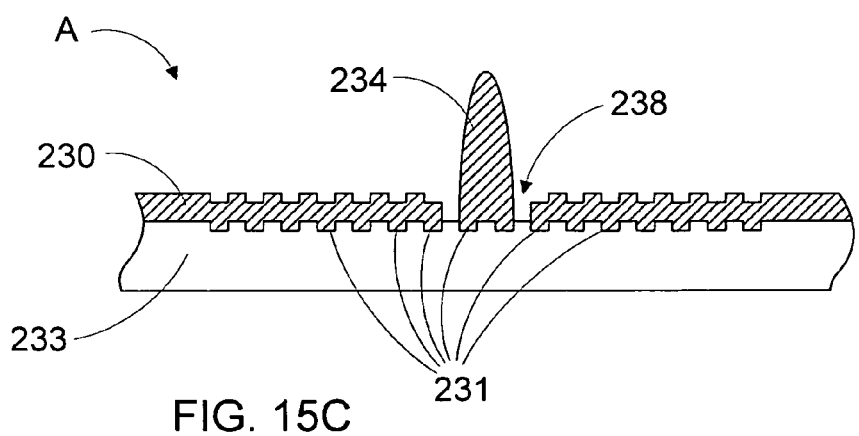
FIG. 15C is an enlarged view of portion A of FIG. 15B.

FIG. 15C is an enlarged view of portion A of FIG. 15B. A transparent film 233 has rulings 231, as shown. A metal coating 230 covers film 233 except at aperture 238 and on tip 234; metal coating 230 thus forms a plasmon enhancement structure. Tip 234 centers within aperture 238 and may cooperate with the plasmon enhancement structure to focus electromagnetic radiation that transmits through aperture 238. Tip 234 may have a length of about 0.25 micron to 1.0 micron. Since the height of plasmon enhanced optical probe 210 relative to disk 250 is primarily set by the "flying" characteristics of pads 220, tip 234 is not used for measuring tip-to-sample distance. Thus, an increased tip length (e.g., like the length of extensions 34(1)–34(5) and tip 134) is not desirable for tip 234 due to an increased fragility associated with the increased length.

Other air bearing sliders may differ from the embodiment shown in FIG. 15A, FIG. 15B and FIG. 15C. For example, in one embodiment, tip 234 is not present; or tip 234 may be a different shape than that shown in FIG. 15C; it may instead be a post, a tube, a pyramid, or a partial cylinder. Tip 234 may connect electrically with metal coating 230, or may be insulated from it. When tip 234 is used, optical probe 210 and tip 234 may be arranged so that the sum of the heights of optical probe 210 and tip 234 is equal to a height of pads 225. When tip 234 is not used, optical probe 210 may have a height that is equal to a height of pads 225. Pads 225 may be different in number and shape than those shown in FIG. 15A. The arrangement of data retrieval system 200 may also vary from that shown and described. For example, a data storage medium may be a disk that is primarily opaque with transparent areas representing data. Alternatively, the data storage medium may be a reflective disk with areas of reduced reflectivity representing data, and the electromagnetic radiation source and detector may be on the same side of the disk.

Figure 16A:
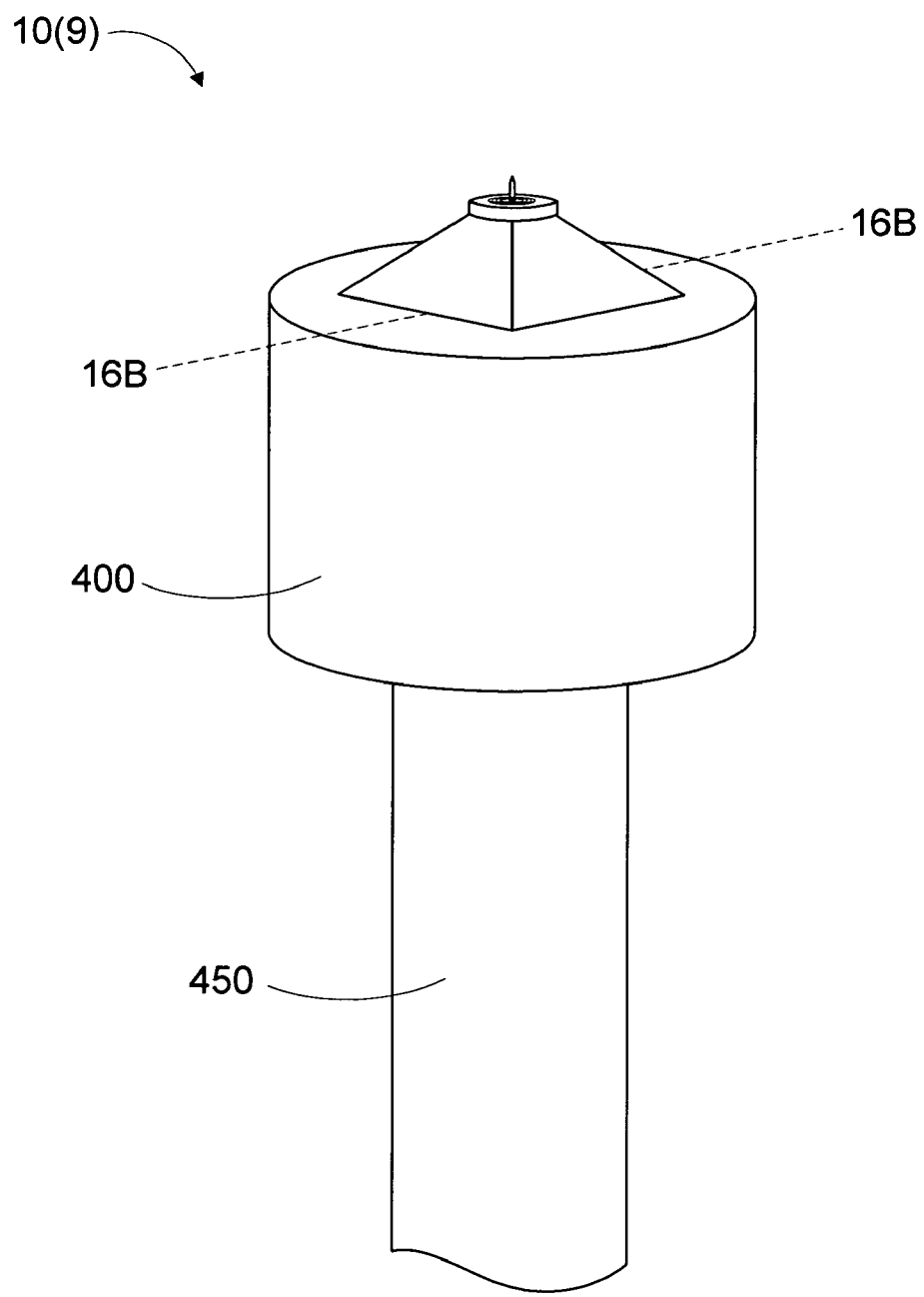
FIG. 16A is a perspective view of a micromachined end cap and a portion of optical fiber forming one plasmon enhanced near-field optical probe, in accord with an embodiment.

FIG. 16A is a perspective view of a micromachined end cap 400 and a portion of optical fiber 450 forming a plasmon enhanced near-field optical probe 10(9). Optical probe 410 operates by transmitting electromagnetic radiation from optical fiber 450 through end cap 400, as described in more detail below. Optical fiber 450 may be, for example, UV grade optical fiber. Two different embodiments of end cap 400, each for a different optical fiber 450, are described below as (a) end cap 400(1) for optical fiber 450(1) and (b) end cap 400(2) for optical fiber 450(2).

Figure 16B:
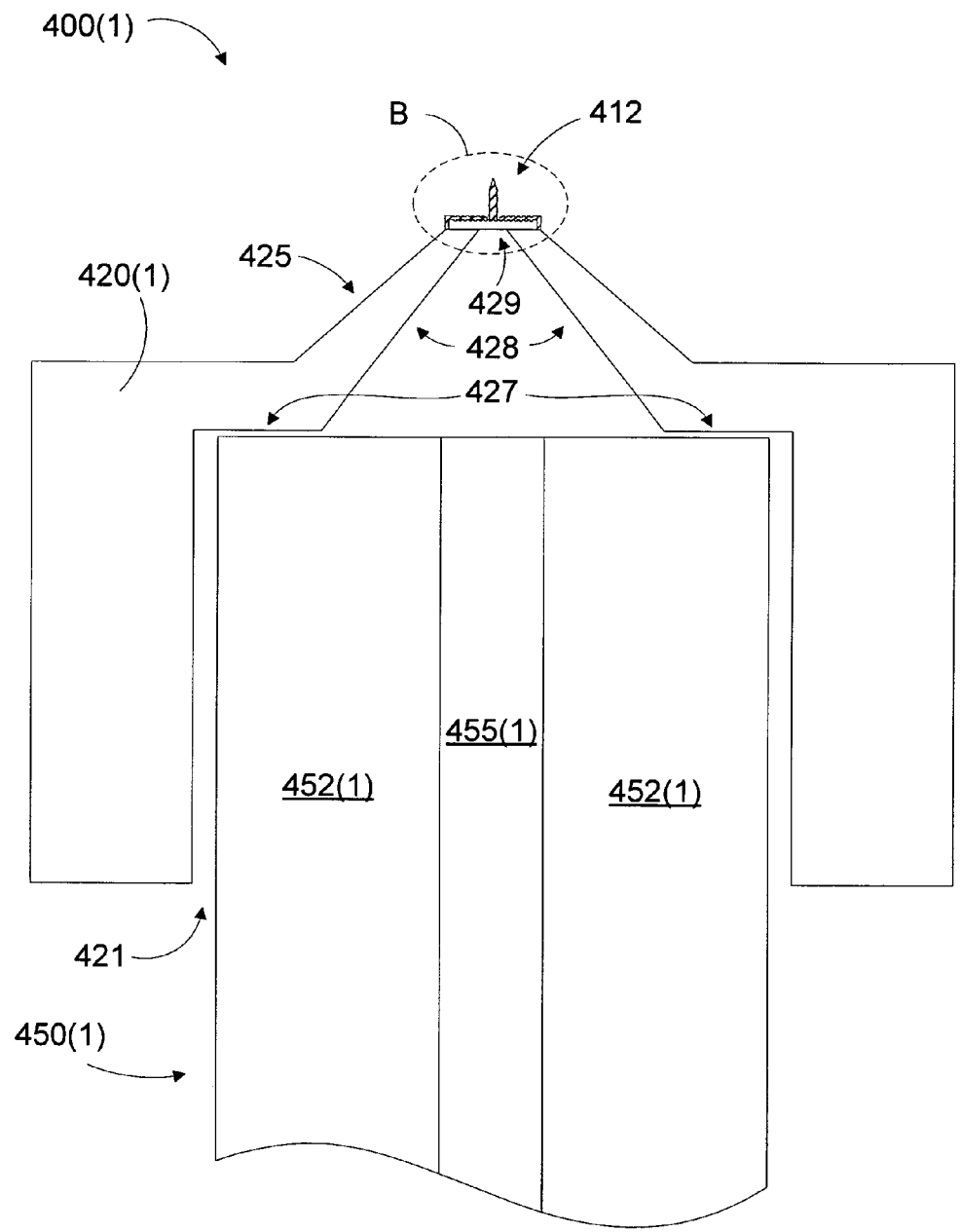
FIG. 16B is a longitudinal cross-section of a micromachined end cap and an optical fiber, in accord with an embodiment.

FIG. 16B is a longitudinal cross-section of micromachined end cap 400(1) and optical fiber 450(1) taken along line 16B—16B of FIG. 16A. Optical fiber 450(1) has a core 455 and cladding 452. End cap 400(1) consists of an end cap socket 420(1) and a plasmon transmission structure 412. End cap socket 420(1) may for example be made of silicon. End cap socket 420(1) has an entry aperture 421 for optical fiber 450(1), and a fiber stop 427. End cap socket 420(1) also has a support member 425 that ends at an exit aperture 429, and connects with plasmon transmission structure 412. Internal side walls 428 of support member 425 may have a reflective coating to maximize EM radiation transmitted from fiber 450(1) into plasmon transmission structure 412.

Figure 16C:
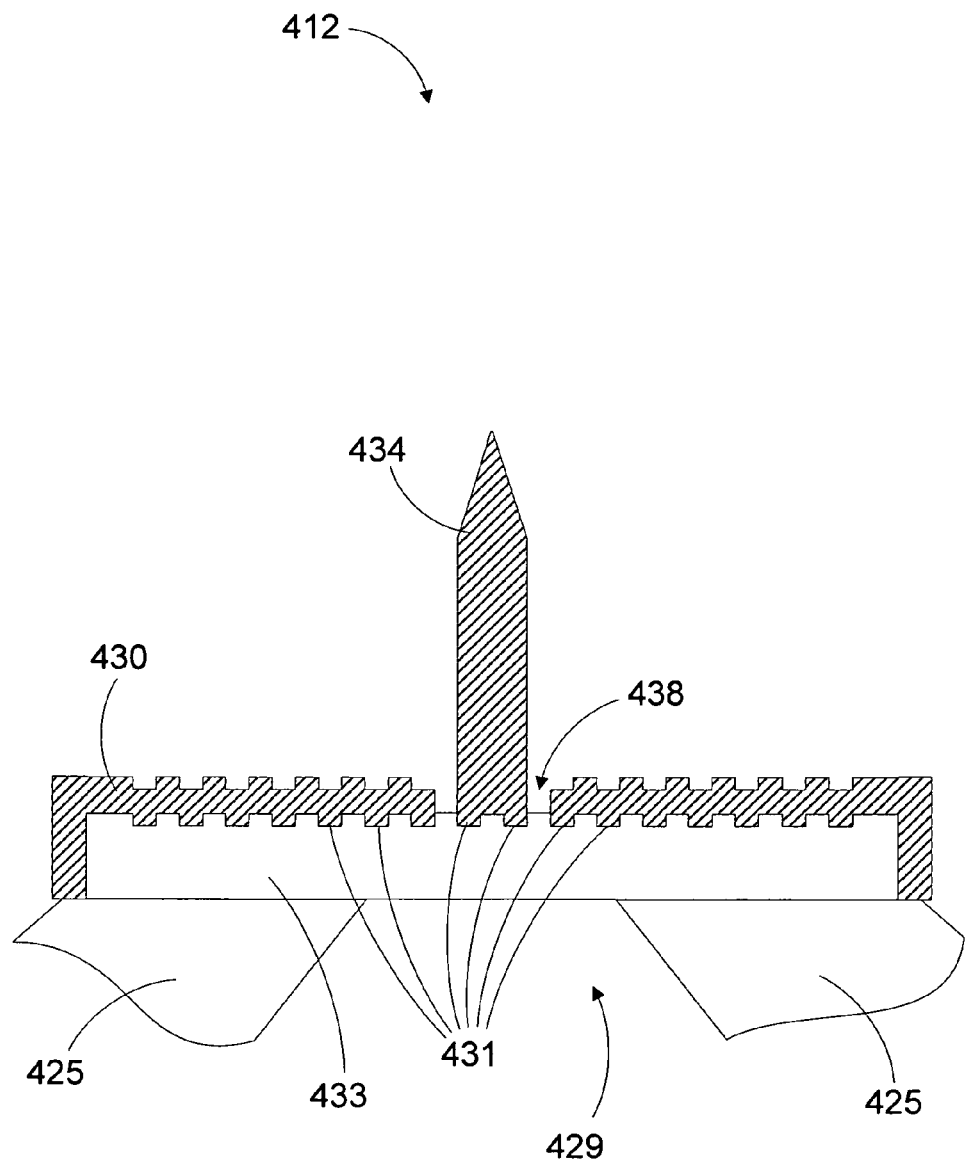
FIG. 16C is an enlarged view of portion B of FIG. 16B.

FIG. 16C is an enlarged view of portion B shown in FIG. 16B. In plasmon transmission structure 412, a transparent film 433 has rulings 431, as shown. A metal coating 430 covers film 433 except at an aperture 438 and on a tip 434; metal coating 430 and film 433 thus form a plasmon enhancement structure. Tip 434 centers within aperture 438 and may cooperate with the plasmon enhancement structure to focus electromagnetic radiation that transmits through aperture 438. Plasmon transmission structure 412 attaches to support member 425 over exit aperture 429, as shown.

Figure 16D:
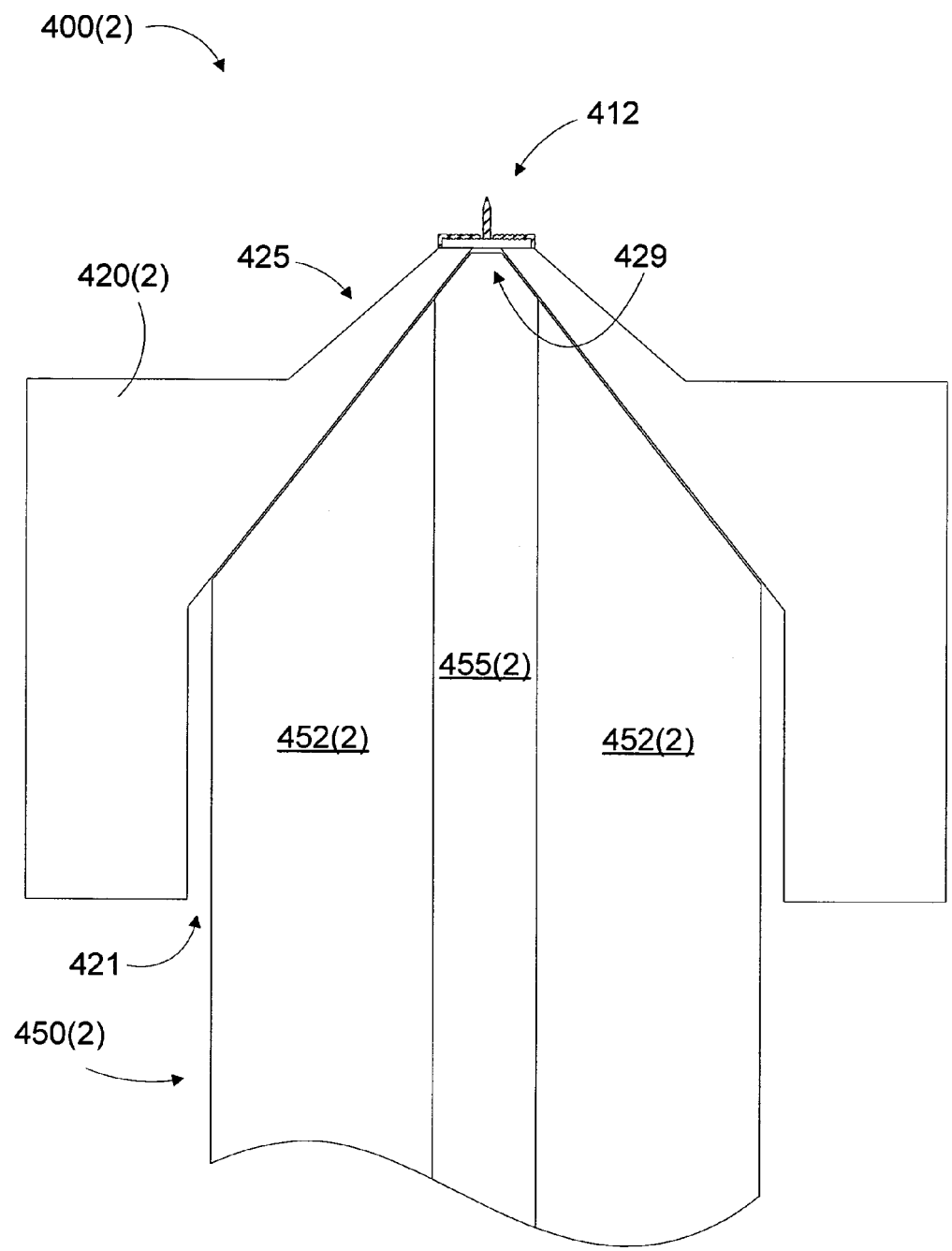
FIG. 16D is a longitudinal cross-section of a micromachined end cap and an optical fiber, in accord with an embodiment

FIG. 16D is a longitudinal cross-section of micromachined end cap 400(2) and optical fiber 450(2) taken along line 16B—16B of FIG. 16A. End cap 400(2) is configured to accept a tapered optical fiber 450(2), as shown; thus end cap 400(2) does not have the fiber stop 427 of end cap 400(1). In other respects, the structure of end cap 400(2) is the same as that of end cap 400(1).

Changes may be made in the plasmon enhanced near-field optical probes described herein without departing from the scope hereof. For example, changes may be made to accommodate different types of optical fibers, such as single mode or multimode fibers. A number, periodicity, or depth of rulings in plasmon structures may be changed to operate with different wavelengths of electromagnetic radiation. One or more dielectric films may be deposited over ruled metal surfaces, or between fiber end surfaces and metal structures, to alter a resonance of plasmon enhancement structures. Plasmon enhancement structures formed at a fiber end surface (e.g., fiber end surface 36) and/or a metal end surface (e.g., metal end surface 32) may be tuned to different resonances by (a) ruling a groove pattern with a first period into the fiber end surface and (b) ruling a groove pattern with a second period into the metal end surface. Plasmon enhancement structures may be tuned by using two adjoining layers of different metals as metal. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A plasmon enhanced near-field optical probe, comprising
    an optical coupler having an end face;
    a metal coating covering, except for an aperture, the end face, the end face and metal coating forming at least one plasmon enhancement structure such that electromagnetic radiation transmitted through the aperture has transmission properties dependent upon ruling of the plasmon enhancement structure; and
    an extension for probe-to-sample separation feedback, the extension extending from the aperture and away from the optical coupler.

2. The optical probe of claim 1, the plasmon enhancement structure comprising ruling within the metal coating such that electromagnetic radiation transmitted through the aperture has directionality dependent upon the ruling.

3. The optical probe of claim 2, the ruling having a depth between about 40 nm and 60 nm.

4. The optical probe of claim 1, the plasmon enhancement structure comprising ruling at an end face of the optical coupler such that electromagnetic radiation transmitted through the aperture has transmission dependent upon the ruling.

5. The optical probe of claim 4, the ruling having a depth between about 40 nm and 60 nm.

6. The optical probe of claim 1, the extension forming one of a post, a pyramid, a cylinder and a cone.

7. The optical probe of claim 1, the extension being between about one micron and five microns in length.

8. The optical probe of claim 1, the extension comprising a tip that is less than about 200 nm wide.

9. The optical probe of claim 8, the tip being less than about 30 nm wide.

10. The optical probe of claim 1, the extension being an electrical conductor that is electrically connected with the plasmon enhancement structure.

11. The optical probe of claim 1, the extension being an electrical conductor that is electrically isolated from the plasmon enhancement structure.

12. The optical probe of claim 1, the optical coupler comprising optical fiber.

13. The optical probe of claim 1, the optical coupler comprising a light guide.

14. The optical probe of claim 1, the end face being flat or conically shaped.

15. The optical probe of claim 1, further comprising
    a socket forming an entry aperture arid an exit aperture, the entry aperture configured to hold an end of an optical fiber, the socket configured to position the plasmon enhancement structure in the exit aperture, such that the socket and the plasmon enhancement structure form a plasmon enhanced optical probe end cap.

16. The optical probe of claim 15, wherein the extension extends from plasmon enhancement structure away from the socket.

17. The optical probe of claim 15, wherein the socket comprises reflective surfaces for reflecting electromagnetic radiation from the optical fiber into the exit aperture.

18. The optical probe of claim 15, wherein the socket has a fiber stop.

19. The optical probe of claim 1, wherein the optical probe facilitates acceptable probe-to-sample distance resolution for samples having surface features with vertical dimensions on the order of a length of the extension.

20. The optical probe of claim 1, wherein the optical probe facilitates acceptable probe-to-sample distance resolution for samples having surface features with lateral dimensions on the order of a width of the extension.

* * * * *